United States Patent

Hanke et al.

[11] Patent Number: 5,347,413
[45] Date of Patent: Sep. 13, 1994

[54] DE-SWAGING TECHNIQUE FOR HEAD GIMBAL ASSEMBLY

[75] Inventors: Lawrence E. Hanke, Eagan; Dennis R. Nielsen, Apple Valley; David D. Koester, Chanhassen, all of Minn.

[73] Assignee: Seagate Technology, Inc., Scotts Valley, Calif.

[21] Appl. No.: 976,369

[22] Filed: Nov. 13, 1992

[51] Int. Cl.[5] .................................... G11B 21/16
[52] U.S. Cl. ...................... 360/104; 29/426.5; 29/603
[58] Field of Search ............... 29/603, 426.5; 360/103, 360/104, 106

[56] References Cited

U.S. PATENT DOCUMENTS

| | | |
|---|---|---|
| 922,096 | 5/1909 | Cunningham . |
| 1,242,392 | 10/1917 | Underwood . |
| 1,535,469 | 4/1925 | Hoffman . |
| 2,587,139 | 2/1952 | Glover . |
| 3,735,163 | 5/1973 | Dijkstra et al. . |
| 4,057,886 | 11/1977 | Brass . |
| 4,135,416 | 1/1979 | Roux . |
| 4,279,072 | 7/1981 | Maurer ................................. 29/764 |
| 4,391,035 | 7/1983 | Van de Bult . |
| 4,399,476 | 8/1983 | King . |
| 4,433,463 | 2/1984 | Duval . |
| 4,587,587 | 5/1986 | Miller . |
| 4,658,489 | 4/1987 | Johnston . |
| 4,796,122 | 1/1989 | Levy et al. . |
| 4,829,395 | 5/1989 | Coon et al. . |
| 4,884,329 | 12/1989 | Higuchi . |
| 4,947,666 | 8/1990 | Hametner et al. . |
| 5,012,367 | 4/1991 | Toensing . |
| 5,035,044 | 7/1991 | Toensing . |
| 5,097,584 | 3/1992 | Cain et al. . |
| 5,119,537 | 6/1992 | Hamanaka et al. ................... 29/603 |
| 5,140,481 | 8/1992 | Cain et al. ......................... 29/603 X |
| 5,142,770 | 9/1992 | Cain et al. . |

FOREIGN PATENT DOCUMENTS

| | | |
|---|---|---|
| 2730719 | 7/1977 | Fed. Rep. of Germany . |
| 2916696A | 11/1979 | Fed. Rep. of Germany . |
| 59-218666 | 12/1984 | Japan . |
| 2000893A | 1/1979 | United Kingdom . |
| 2020881A | 11/1979 | United Kingdom . |

OTHER PUBLICATIONS

IBM Technical Disclosure Bulletin; vol. 18 No. 1, Jun. 1975 Ball Staking of a Transducer Assembly Mounting Block to a Positioned Arm.

*Primary Examiner*—Carl E. Hall
*Attorney, Agent, or Firm*—Kinney & Lange

[57] ABSTRACT

In a magnetic head carrying device a method and apparatus for removing a magnetic head carrying arm from a support arm wherein ball stake mounting is used to affix the magnetic head carrying arm to the support arm. Tool receiving holes are provided in the magnetic head carrying arm, in a mounting plate, and in the support arm. Raised portions of a first tool may be inserted into the tool receiving holes of the magnetic head carrying arm and of the mounting plate. Raised portions of a second tool may be inserted into the tool receiving hole of the support arm. As the first and second tools are forced together, the ball stake mount is disassembled.

10 Claims, 4 Drawing Sheets

DE-SWAGING TECHNIQUE FOR HEAD GIMBAL ASSEMBLY

BACKGROUND OF THE INVENTION

The present invention relates to the arm used to carry a magnetic head in a magnetic disk drive unit. In particular, the invention relates to a method of removing a ball stake (or swage) mounted magnetic head from the support arm.

There has been a continual drive to increase the storage density in magnetic disk drive units. This has been achieved in part by stacking magnetic disks in a "pack" all carried within the same disk drive unit. Each side of each disk has its own associated magnetic head used for reading and writing information thereon. Each magnetic head has its own associated support arm which positions the head above the disk surface. By moving the arm, the magnetic head is moved between tracks on the disk surface. A servomotor is connected to the opposite end of the support arm. The magnetic head is moved between tracks by activating the servomotor whereby the support arm pivots and the magnetic head at the opposite tip of the arm is swung between adjacent tracks on the disk surface. A linear actuator may alternatively be used to move a magnetic head. A linear actuator moves the head inward or outward on the disk along a straight line.

To further increase space savings in the disk drive unit, a single servomotor typically controls all of the support arms and their associated magnetic heads. Thus, all of the support arms are connected together and pivot about the same pivot point. This configuration is identified as an "E-block" (which refers to the shape formed by the adjacent arms and the servomotor/pivot assembly).

Each magnetic head is connected to the support arm using a mounting method known as "ball staking" or "swaging." In ball staking two pieces, a hole in one piece is aligned with a hollow tube which extends from a second piece. A rounded shape (the "ball") is forced through the hollow tube which causes the tube metal to expand and lock the two pieces together.

A problem associated with past ball stake mount designs is that there was no economical method to remove a single defective magnetic head from the assembly. Once ball stake mounted, the support structure was very difficult to disassemble and was easily damaged. Thus, the entire E-block assembly typically had to be replaced if a single magnetic head malfunctioned.

One attempt to overcome the problems associated with past ball stake mount designs was disclosed in Toensing, U.S. Pat. No. 5,012,367 which has been assigned to Seagate Technology, Inc., the assignee of the present application. Toensing disclosed a removable ball staked head gimbal assembly as well as a method and apparatus of removing the assembly. In the assembly disclosed in Toensing, a bevel was provided between the ball staked support arm and magnetic head carrying arm. A removal tool is then inserted into the bevel so that the ball staked pieces are pried apart. The bevel is preferably provided by a mounting plate which is mounted to one of the arms. Ball staking occurs through the method described above.

In some instances, the deswaging operation causes the support arm to be bent during the removal process. If a single support arm of an E-block assembly is bent, the entire E-block assembly must be scrapped, increasing both the labor and the material costs of repair. Removal of the ball staked assembly may also result in damage to the magnetic head supporting arm. Often times, this makes it impossible to perform a failure analysis on the defective magnetic head assembly.

SUMMARY OF THE INVENTION

The present invention provides a method for removing a single ball staked magnetic head from its associated support arm. Using the present invention when a single magnetic head in an E-block assembly malfunctions, it is only necessary to replace that magnetic head, without discarding the entire E-block assembly.

In the present invention, a magnetic transducer support is provided, the support comprises a first arm which carries a magnetic transducer head, a mounting plate which is joined to the first arm, and a second arm. The first arm includes a first hole which creates a first passageway through the first arm. Tool receiving holes in the first arm also create passageways therethrough for receiving a first disassembly tool. A second arm includes a hole, aligned with the first hole, the hole being capable of receiving a second disassembly tool. A mounting plate, joined to the first arm, includes a tubular member aligned with the first hole of the first arm and with the hole of the second arm. The tubular member extends into the hole of the second arm for ball staking the mounting plate to the second arm. The tubular member has a diameter smaller than the diameter of the hole in the second arm so that the second disassembly tool may not be inserted into the mounting plate. The mounting plate also has tool receiving holes aligned with the tool receiving holes of the first arm for receiving the first disassembly tool.

To remove the ball staked assembly, the first disassembly tool is inserted into the aligned tool receiving holes of the first arm and mounting plate. A second disassembly tool is inserted into the hole of the second arm. The first and second disassembly tools are forced toward each other so that the first disassembly tool applies force on the second arm and so that the second disassembly tool applies force on the joined first arm and mounting plate, pushing the first and second arms apart. The present invention offers significant cost advantages over the prior art because it results in reduced labor and material costs by reducing the number of E-block assemblies that must be discarded as a result of damage during removal of a single malfunctioning magnetic head.

DETAILED DESCRIPTION OF THE PREFERRED EMBODIMENTS

Figure 1:
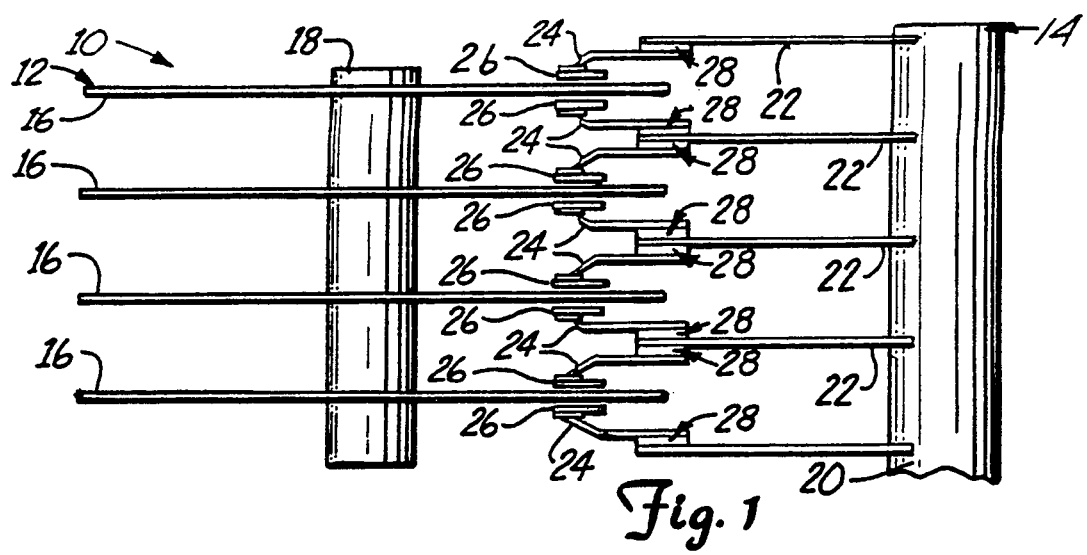
FIG. 1 shows a disk pack and its associated E-block assembly.

A disk drive assembly 10 is shown in FIG. 1 comprising a disk pack 12 and E-block assembly 14. Disk pack 12 comprises disks 16 stacked on a drive spindle 18. E-block assembly 14 comprises a servo spindle 20 and a plurality of support arms 22. Each support arm 22 carries one or two flexure arms 24. Each flexure arm 24 carries a magnetic head assembly 26. Each flexure arm 24 is mounted to its corresponding support arm 22 by ball stake mount 28. The particular method of mounting ball stake mount 28 is explained below in more detail.

Figure 2:
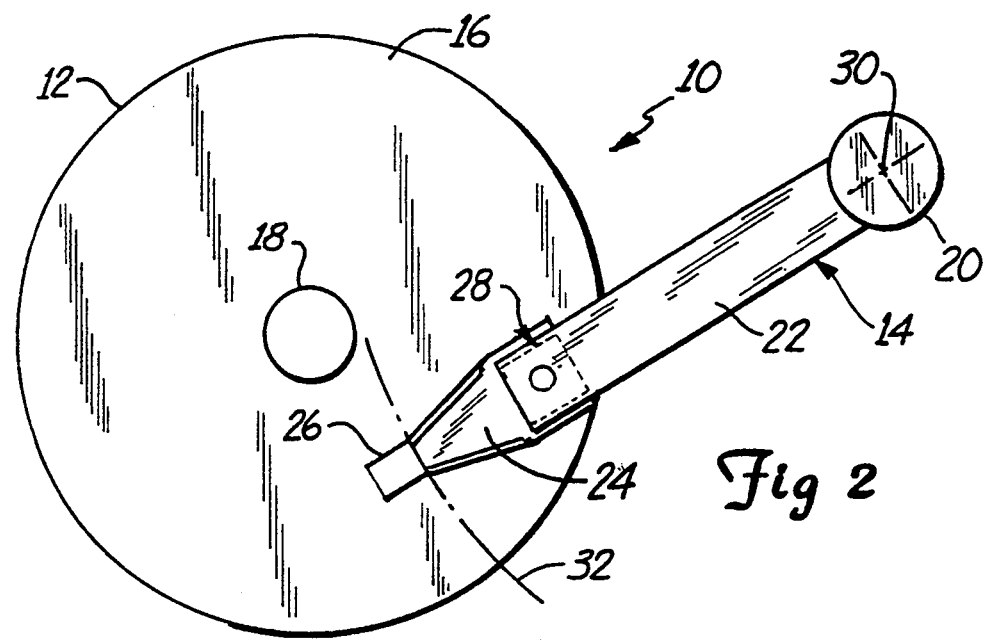
FIG. 2 is a top view of a magnetic disk and magnetic head arm.

FIG. 2 shows a top view of disk drive assembly 10 of FIG. 1. Servo spindle 20 rotates around a pivot axis 30. As servo spindle 20 rotates, magnetic head assembly 26 mounted at the tip of flexure arm 24 swings through arc 32. As disk 16 rotates beneath magnetic head 26, this pivoting motion allows magnetic head assembly 26 to change track positions on disk 16. As shown in FIG. 1, as drive spindle 18 rotates all magnetic head assemblies 26 move in unison.

Figure 3:
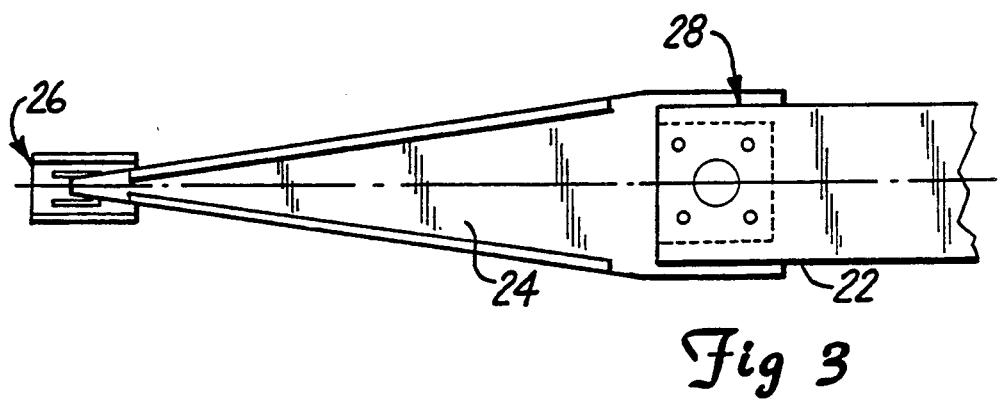
FIG. 3 is a top view of a magnetic head arm.
Figure 4:
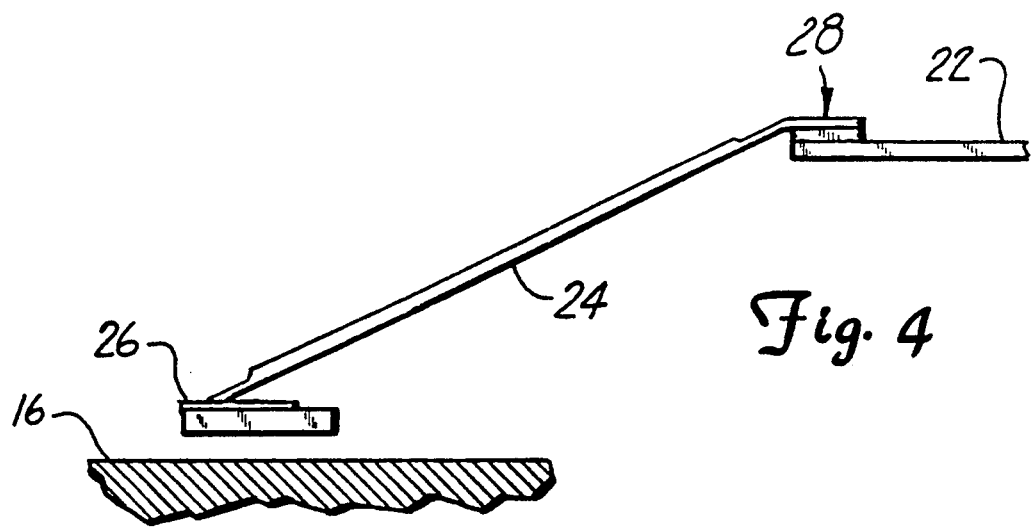
FIG. 4 is a side view of a magnetic head arm, a magnetic head assembly and a magnetic disk surface.

In FIGS. 3 and 4, a more detailed diagram of flexure arm 24 is shown. Flexure arm 24 is spring loaded, whereby magnetic head assembly 26 is held in close proximity to disk 16. As disk 16 rotates at high speed about drive spindle 18, the aerodynamic properties of magnetic head assembly 26 cause assembly 26 to "fly" above the surface of disk 16. The flying height of magnetic head assembly 26 above disk 16 is a function of the speed of rotation of disk 16, the aerodynamic lift of magnetic head assembly 26 and the spring tension in flexure arm 24.

Figure 5:
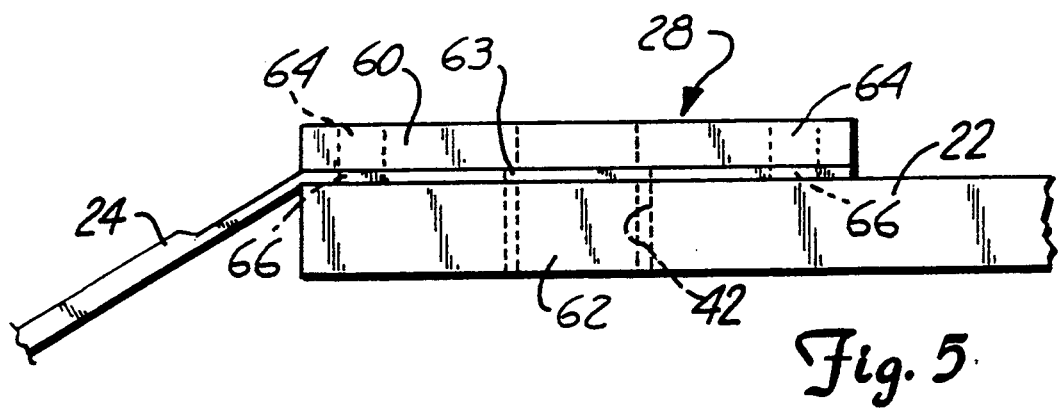
FIG. 5 is a side view of the ball staked magnetic head arm of the present invention.

FIG. 5 shows the removable ball stake mount 28 of the present invention. Ball stake mount 28 connects support arm 22 and flexure arm 24. FIG. 5 shows a mounting plate 60 with a tubular member 62 which extends through hole 63 in flexure arm 24 and hole 42 in support arm 22. Mounting plate 60 includes tool receiving holes 64 which create a passageway through mounting plate 60. Similarly, flexure arm 24 includes tool receiving holes 66 which create a passageway through flexure arm 24. Tool receiving holes 64 and 66 are aligned so that a first disassembly tool (shown in FIGS. 11 and 12) may be inserted into the passageway created by tool receiving holes 64 and 66. During manufacture, mounting plate 60 is bonded to flexure arm 24 using, for example, a laser welding procedure. Ball staked mount 28 is ball staked in the method as described above by forcing an object with a diameter larger than the diameter of tubular member 62 through tubular member 62, hole 63 in flexure arm 24, and hole 42 in support arm 22. As will be discussed, hole 42 in support arm 22 and tool receiving holes 64 and 66 in mounting plate 60 and flexure arm 24 provide the means for separating support arm 22 from flexure arm 24 following ball staking.

Figure 6:
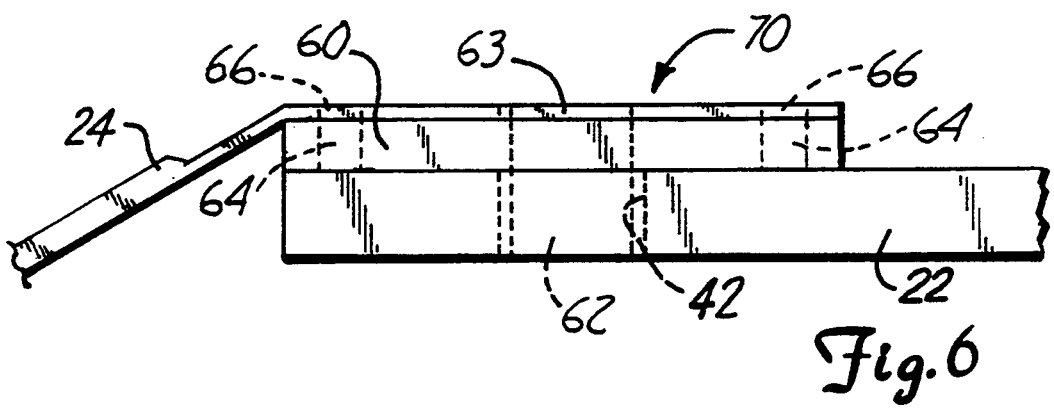
FIG. 6 is a side view of an alternative embodiment of the ball staked magnetic head arm of the present invention.

FIG. 6 shows an alternative embodiment of the removable ball stake mount shown in FIG. 5. As is the case with ball stake mount 28, ball stake mount 70 connects support arm 22 to flexure arm 24. Flexure arm 24 still includes hole 63 and tool receiving holes 66. Mounting plate 60 still includes tubular member 62 and tool receiving holes 64. Tool receiving holes 64 of mounting plate 60 are aligned with tool receiving holes 66 of flexure arm 24. However, in the embodiment of FIG. 6, mounting plate 60 is sandwiched between support arm 22 and flexure arm 24, with tubular member 48 extending through hole 42 of support arm 22.

Figure 7:
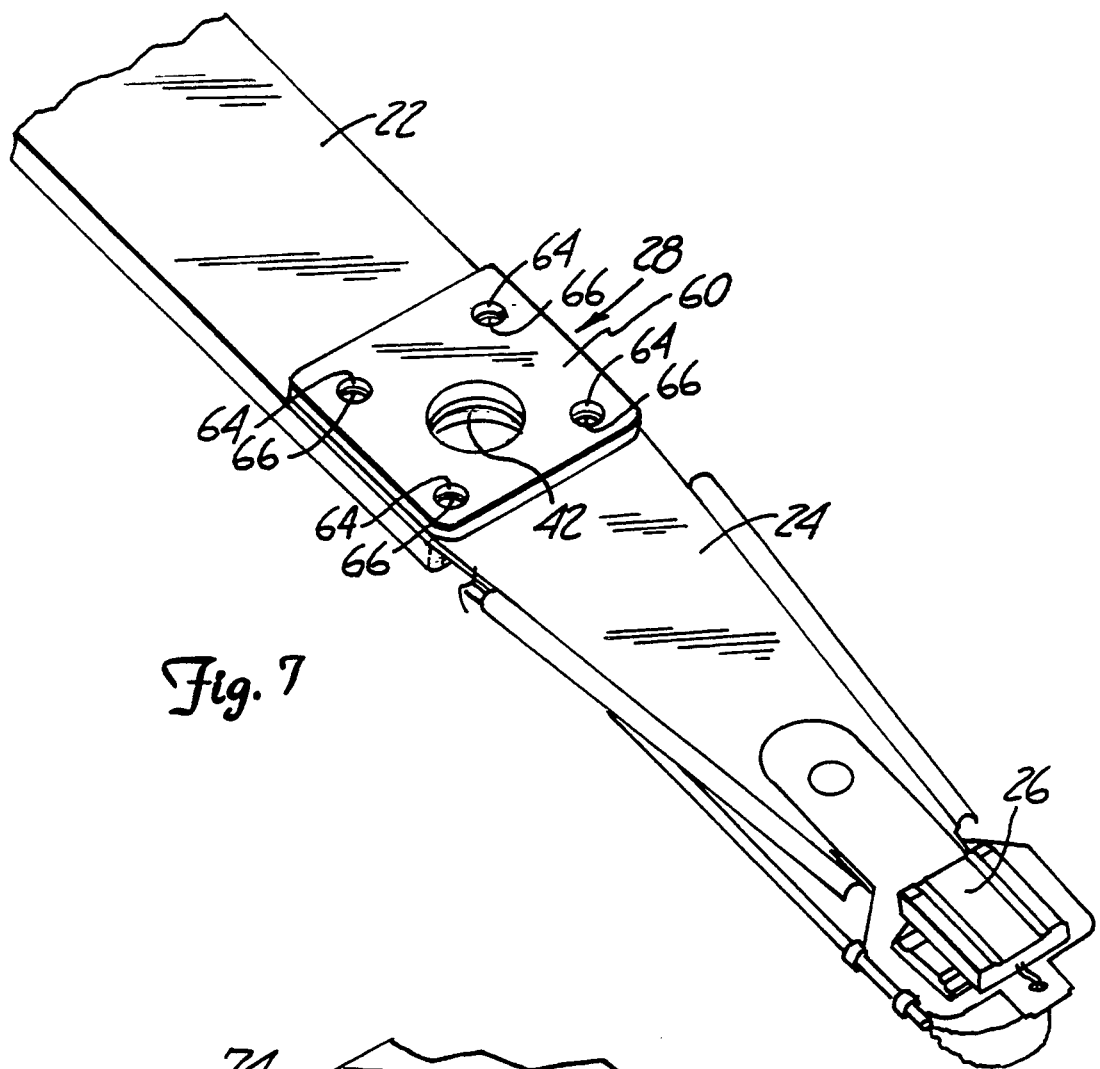
FIG. 7 is a perspective view of the ball staked magnetic head arm of the present invention.

FIG. 7 shows another view of the ball stake mount 28 shown in FIG. 5. In FIG. 7, support arm 22 is shown ball stake mounted to flexure arm 24 and mounting plate 60. Also shown in FIG. 7 are four tool receiving holes 64 in mounting plate 60 aligned with four tool receiving holes 66 in flexure arm 24. At the bottom of each aligned pair of tool receiving holes 64 and 66 is a portion of support arm 22, which prevents a disassembly tool (shown in FIGS. 8 and 9) from passing through ball stake mount assembly 28. Also shown is hole 42 of support arm 22 which has a larger diameter than tubular member 62 so that a second disassembly tool (shown in FIGS. 8 and 9), which is inserted into hole 42, will not pass through ball stake mount assembly 28.

Figure 8:
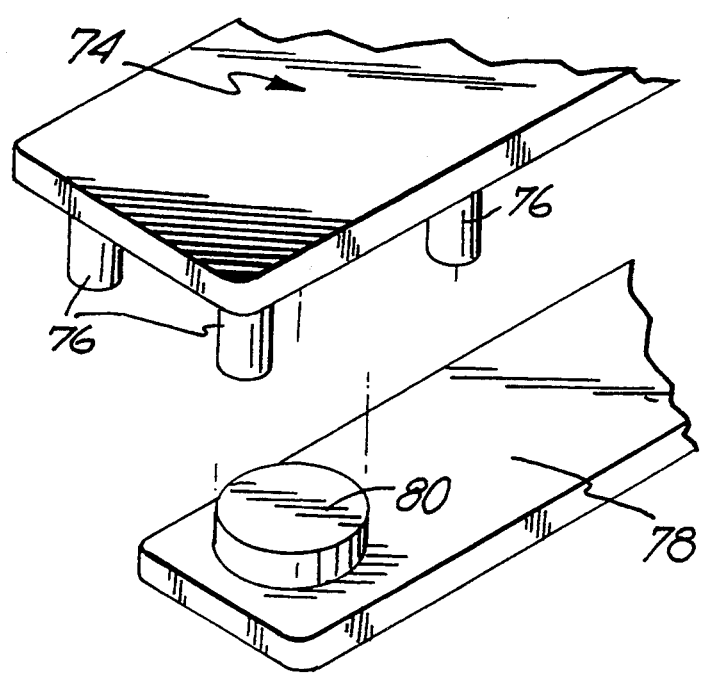
FIG. 8 is a perspective view of a tool used to remove the ball staked mount.

FIG. 8 shows a first disassembly tool 74 with cylindrical raised portions 76 and a second disassembly tool 78 with cylindrical raised portion 80. Disassembly tools 74 and 78 may be used in conjunction with ball stake mount 28 and 70 of the present invention to separate support arm 22 from flexure arm 24 following ball staking.

Figure 9:
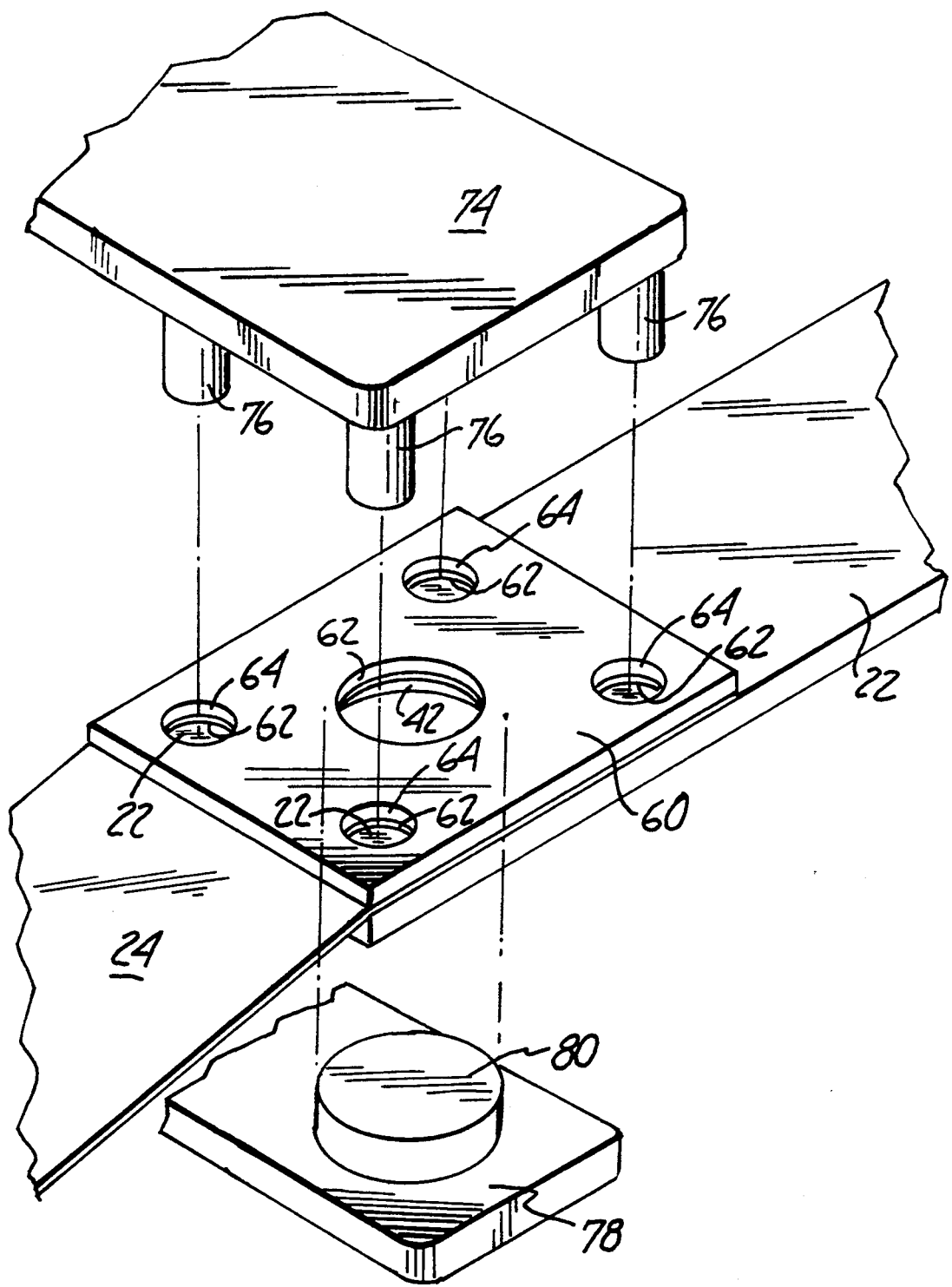
FIG. 9 is a perspective view showing the relationship between the removal tool and the ball staked mount.

FIG. 9 illustrates how disassembly tools 74 and 78 are used with ball stake mount 28 to separate flexure arm 24 from support arm 22. Disassembly tool 74 is pushed into ball stake mount 28 so that cylindrical raised portions 76 pass through tool receiving holes 64 of mounting plate 60 and tool receiving holes 66 of flexure arm 24. As disassembly tool 74 is pushed toward ball stake mount 28, the surface of raised portions 76 come into direct contact with portions of support arm 22. Similarly, disassembly tool 78 is pushed toward ball stake mount 28 so that cylindrical raised portion 80 passes through hole 42 of support arm 22 and comes into direct contact with portions of tubular member 62. As disassembly tools 74 and 78 are brought together, the pressure exerted by raised cylindrical portion 80 on tubular member 62 pushes flexure arm 24 and mounting plate 60 away from support arm 22. Likewise, the pressure exerted by raised cylindrical portions 76 on support arm 22 pushes support arm 22 away from flexure arm 24 and mounting plate 60. In this manner, disassembly tools 74 and 78 may be used to separate flexure arm 24 and support arm 22 while causing less stress on ball stake mount 28. Therefore, the likelihood of damaging either flexure arm 24 or support arm 22 is decreased.

Holes 64 in mounting plate 60 and holes 66 in flexure arm 24 allow the disassembly force to be more evenly spread over support arm 22. This reduces the torque applied to arm 22, thereby reducing any deformation of arm 22 during deswaging which might damage arm 22.

Although the present invention has been described with reference to preferred embodiments, workers skilled in the art will recognize that changes may be made in the form and detail without departing from the spirit and scope of the invention. For example, the raised portions of the disassembly tools may be formed in any useful shape. Additionally, the number and shape of tool receiving holes in the ball stake mount may be changed.

What is claimed is:

1. An apparatus in a magnetic transducer support for connecting a magnetic transducer carrying arm to a support arm, the apparatus comprising:
   a ball stake connection for mounting the support arm to the transducer carrying arm, the ball stake connection comprising a first hole defined in the support arm and creating a passageway through the support arm, a second hole defined in the transducer carrying arm substantially aligned with the first hole and creating a passageway through the transducer carrying arm, and a tubular member which extends through the first and second holes for connecting the transducer carrying arm to the support arm; and a plurality of tool insertion holes defined in one of the transducer carrying arm and the support arm for receiving a first tool therethrough, the tool insertion holes being arranged in a pattern in the one arm around the respective first or second hole, the other of the support arm and the transducer carrying arm having a surface exposed to the tool insertion holes, wherein the first tool extends through the tool insertion holes to apply a force to the surface on the other of the support arm and the transducer carrying arm to disconnect the tubular member from at least one of the transducer carrying arm and the support arm thereby disengaging the ball stake connector.

2. The apparatus of claim 1, wherein the tool insertion holes are defined in the transducer carrying arm so that the first tool applies force to the surface of the support arm and the first hole defined in the support arm is adapted for receiving a second tool therethrough, wherein the second tool applies a force to the transducer carrying arm while the first tool applies a force to the surface of the support arm thereby disengaging the ball stake connection.

3. The apparatus of claim 1, wherein the tool insertion holes defined in the one of the transducer carrying arm and the support arm are so disposed and arranged relative to one another that the ball stake connection is disengaged without substantially bending the support arm.

4. The apparatus of claim 1, wherein the tool insertion holes defined in the one of the transducer carrying arm and the support arm are so disposed and arranged relative to one another that the ball stake connection is disengaged without substantially bending the transducer carrying arm.

5. A magnetic transducer support having a transducer carrying arm and a support arm and a swage connection mounting the transducer carrying arm to the support arm, the magnetic transducer support comprising:

a plurality of first tool insertion holes defined in one of the transducer carrying arm and the support arm for receiving a first tool, the tool insertion holes being arranged in a pattern in the one arm around the swage connection the other of the support arm and the transducer carrying arm having a surface exposed to the first tool insertion holes wherein the first tool applies a force through the first tool insertion holes and against the surface on the other of the support arm and the transducer carrying arm to disengage the swage connection thereby separating the transducer carrying arm and the support arm.

6. The magnetic transducer support of claim 5 and further comprising:

a second tool insertion hole defined in the other of the support arm and the transducer carrying arm for receiving a second tool, wherein the second tool applies a force through the second tool insertion hole and against a surface of the one of the transducer carrying arm and the support arm thereby separating the transducer carrying arm and the support arm.

7. The magnetic transducer support of claim 5 and further comprising:

a mounting plate for swage mounting the transducer carrying arm to the support arm; and a plurality of third tool insertion holes defined in the mounting plate and aligned with the plurality of first tool insertion holes for receiving the first tool, wherein the first tool applies a force through the first and third tool insertion holes and against the other of the support arm and the transducer carrying arm thereby separating the transducer carrying arm and the support arm.

8. An apparatus in a magnetic transducer support for connecting a transducer carrying arm to a support arm with a ball stake connector, the apparatus comprising:

a first hole defined in the support arm for receiving the ball stake connector for connecting the transducer carrying arm to the support arm;

a second hole defined in the transducer carrying arm for receiving the ball stake connector for connecting the transducer carrying arm to the support arm, the second hole being aligned with the first hole; and a plurality of tool insertion holes defined in one of the transducer carrying arm and the support arm for receiving a first tool therethrough, the tool insertion holes being arranged in a pattern in the one arm around the respective first or second hole the other of the support arm and the transducer carrying arm having a surface exposed to the tool insertion holes, wherein the first tool applies a force through the tool insertion holes and against the surface on the other of the support arm and the transducer carrying arm to disconnect the ball stake connector from at least one of the transducer carrying arm and the support arm thereby disconnecting the transducer carrying arm and the support arm.

9. The apparatus of claim 8, wherein the tool insertion holes defined in the one of the transducer carrying arm and the support arm are so disposed and arranged relative to the first and second holes that the transducer carrying arm and the support arm are disconnected without substantially bending the support arm.

10. The apparatus of claim 8, wherein the tool insertion holes defined in the one of the transducer carrying arm and the support arm are so disposed and arranged relative to the first and second holes that the transducer carrying arm and the support arm are disconnected without substantially bending the transducer carrying arm.

* * * * *

UNITED STATES PATENT AND TRADEMARK OFFICE
CERTIFICATE OF CORRECTION

PATENT NO. : 5,347,413

DATED : September 13, 1994

INVENTOR(S) : LAWRENCE E. HANKE, DENNIS R. NIELSEN, DAVID D. KOESTER

It is certified that error appears in the above-indentified patent and that said Letters Patent is hereby corrected as shown below:

On the Title Page of the Patent, delete [54] DE-SWAGING TECHNIQUE FOR HEAD GIMBAL ASSEMBLY insert [54] DE-SWAGEABLE HEAD GIMBAL ASSEMBLY

Col. 1, delete lines 1-2, insert --DE-SWAGEABLE HEAD GIMBAL ASSEMBLY--

Col. 5, line 54, after "connection", insert a --,--

Col. 5, line 56, after "holes", insert a --,--

Signed and Sealed this

Twenty-eight Day of February, 1995

Attest:

BRUCE LEHMAN

*Attesting Officer*   *Commissioner of Patents and Trademarks*